(12) United States Patent
Takayanagi

(10) Patent No.: US 12,401,926 B2
(45) Date of Patent: Aug. 26, 2025

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventor: Isao Takayanagi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 197 days.

(21) Appl. No.: 18/466,454

(22) Filed: Sep. 13, 2023

(65) Prior Publication Data

US 2024/0089631 A1 Mar. 14, 2024

(30) Foreign Application Priority Data

Sep. 13, 2022 (JP) .................................. 2022-145302

(51) Int. Cl.
*H04N 25/772* (2023.01)
*H04N 25/65* (2023.01)

(52) U.S. Cl.
CPC ........... *H04N 25/772* (2023.01); *H04N 25/65* (2023.01)

(58) Field of Classification Search
CPC ...... H04N 25/616; H04N 25/65; H04N 25/77; H04N 25/772
See application file for complete search history.

(56) References Cited

U.S. PATENT DOCUMENTS

| | | |
|---|---|---|
| 7,164,114 B2 | 1/2007 | Lai et al. |
| 2010/0181464 A1 | 7/2010 | Veeder |
| 2024/0348947 A1* | 10/2024 | Hasegawa .............. H04N 25/79 |

OTHER PUBLICATIONS

Aoki et al., "A Rolling-Shutter Distortion-Free 3D Stacked Image Sensor with -160dB Parasitic Light Sensitivity In-Pixel Storage Node", IEEE International Solid-State Circuits Conference, Session 27, Image Sensors, 27.3, Feb. 22, 2013, pp. 1-3.

* cited by examiner

*Primary Examiner* — Daniel M Pasiewicz
(74) *Attorney, Agent, or Firm* — Pillsbury Winthrop Shaw Pittman LLP

(57) ABSTRACT

A solid-state imaging device includes: an output buffer part adapted to convert charge at an output node into a voltage signal corresponding to the amount of the charge, and output an active comparison result signal when the voltage signal and a first reference signal are the same level; an output buffer part adapted to convert the charge at the output node into a voltage signal corresponding to the amount of the charge, compare the voltage signal with the first reference signal, and output the active comparison result signal when the voltage signal and the first reference signal are the same level; the holding signal readout part disposed between the input node of the signal holding part and the feeding line of the second reference signal, conduction or non-conduction of the holding signal readout part being controlled depending on the comparison result signal outputted by the output buffer part.

16 Claims, 10 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2022-145302 (filed on Sep. 13, 2022), the contents of which are hereby incorporated by reference in its entirety.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charge are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

The CMOS image sensor may sequentially scan the pixels or rows one-by-one to read the charge generated by photoelectric conversion and stored in the photodiodes. When such sequential scan is employed, in other words, a rolling shutter is employed as the electronic shutter, it is not possible to start and end the exposure for storing the charge produced by photoelectric conversion at the same time in all of the pixels. Therefore, the sequential scan has such a problem that, when a moving object is imaged, a captured image may experience distortion.

In a case where image distortion is not acceptable, for example, for the purposes of imaging a fast moving object and sensing that requires simultaneity among the captured images, a global shutter is employed as the electronic shutter. When the global shutter is employed, the exposure can be started and ended at the same timing in all of the pixels of the pixel array part.

In a CMOS image sensor employing a global shutter as the electronic shutter, a pixel has therein a signal holding part for retaining, in a sample-and-hold capacitor, a signal that is read out from a pixel light-receiving part (photoelectric conversion reading part), for example. The CMOS image sensor employing a global shutter samples and holds in an analog manner and stores the charge from the photodiodes in the signal hold capacitors of the signal holding parts at the same time in the form of voltage signals and subsequently sequentially read the voltage signals. In this way, the simultaneity is reliably achieved among the images (see, for example, J. Aoki, et al., "A Rolling-Shutter Distortion-Free 3D Stacked Image Sensor with −160 dB Parasitic Light Sensitivity In-Pixel Storage Node" ISSCC 2013/ SESSION 27/IMAGE SENSORS/27.3.).

The CMOS image sensor of this type may be provided with a bypass switch to enable the output from the photoelectric conversion reading part to bypass the signal holding part and be transferred to a signal line, thereby having the rolling shutter function in addition to the global shutter function.

To address this issue, a digital pixel sensor has been proposed that has, in each pixel, an ADC including a comparator (and additionally a memory part), so that the sensor can realize a global shutter according to which the exposure to light can start and end at the same timing in all of the pixels of the pixel array part (see, for example, U.S. Pat. No. 7,164,114 B2 FIG. 4 and United States Patent Application Publication No. 2010/0181464 A1).

CMOS image sensors having a high dynamic range and high image quality include pixels with a global shutter function, which are typified by voltage mode global shutter (VMGS) and charge mode global shutter (CMGS) pixels.

The VMGS pixels advantageously have higher shutter efficiency and lower sensitivity to parasitic light than the CMGS pixels.

CMOS image sensors with VMGS pixels may disadvantageously have more significant floor noise than CMOS image sensors with CMGS pixels.

The noise of the VMGS pixels mainly originates from the thermal noise caused by the sampling and holding of the voltage, and the noise voltage Vn can be expressed by the following expression.

$$Vn = \text{SQRT}(kT/C_{SH}) \quad [\text{Expression 1}]$$

In the expression, R, T, k, and $C_{SH}$ respectively denote the resistance, absolute temperature, Boltzmann's constant, and capacitance value of the sample-and-hold capacitance element, and SQRT means the square root.

The voltage signal Vs is represented by the following expression using the electronic voltage conversion gain CG.

$$Vs = N\text{sig}(e) \times CG(V/e)$$

The electronic reference noise Nn is thus expressed as follows.

$$Nn(e) = 1/CG \times \text{SQRT}(kT/C_{SH})$$

This expression means that the electronic reference noise Nn can be reduced by increasing the electronic voltage conversion gain CG or the capacitance value $C_{SH}$ of the voltage sample-and-hold capacitor.

Increasing the capacitance value $C_{SH}$ face physical constraints due to the pixel size. In addition, an increase in the electronic voltage conversion gain CG usually results in a decrease in the dynamic range DR. To address this issue, it has been proposed to allow pixels to have a plurality of conversion gains CG in order to increase the dynamic range DR. As having the high conversion gain CG, however, the VMGS pixels, are still inferior to the CMGS pixels in terms of the floor noise.

One of the key performance indices of the CMOS image sensor is random noise, which mainly originates from the pixels and ADCs as is known in the art. It is generally known that the random noise can be reduced by increasing the transistor size to reduce flicker noise or by adding a capacitor to the output of the comparator to lower the band so that the CDS effectively serves as a noise filter. Due to the increased area and capacitance, however, these techniques experience worse inversion delay in the comparator. This disadvantageously encounter difficulties in raising the frame rate of the imaging element.

SUMMARY

An object of the present invention is to provide a solid-state imaging device, a method for driving a solid-state imaging device and an electronic apparatus that are capable of, without increasing the capacitance of a voltage sample-and-hold signal holding capacitor, achieving reduced noise at a voltage sample-and-hold node, thereby achieving a high pixel gain while keeping a low gain for a high-luminance optical signal in a high gain mode, accomplishing low conversion gain read-out in a low gain mode, and substantially realizing enhanced dynamic range and increased frame rate.

A solid-state imaging device according to one aspect of the invention includes a pixel part having pixels arranged therein, each pixel being configured to perform photoelectric conversion, wherein the each pixel includes: a photoelectric conversion element adapted to store therein, in an integration period, charge generated by photoelectric conversion; a transfer element adapted to transfer, in a transfer period following the integration period, the charge stored in the photoelectric conversion element; an output node to which the charge stored in the photoelectric conversion element is transferred through the transfer element; a reset element adapted to reset, in a reset period, the output node to a predetermined voltage; an output buffer part adapted to convert the charge at the output node into a voltage signal corresponding to the amount of the charge, compare the voltage signal with a first reference signal, and output an active comparison result signal when the voltage signal and the first reference signal are at a same level; a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and a holding signal readout part disposed between an input node of the signal holding part and a feeding line of a second reference signal different from the first reference signal, conduction or non-conduction of the holding signal readout part being controlled depending on the comparison result signal outputted by the output buffer part.

According to a second aspect of the invention, provided is a method for driving a solid-state imaging device. The solid-state imaging device includes a pixel part having pixels arranged therein, each pixel being configured to perform photoelectric conversion. Each pixel includes: a photoelectric conversion element adapted to store therein, in an integration period, charge generated by photoelectric conversion; a transfer element adapted to transfer, in a transfer period following the integration period, the charge stored in the photoelectric conversion element; an output node to which the charge stored in the photoelectric conversion element is transferred through the transfer element; a reset element adapted to reset, in a reset period, the output node to a predetermined voltage; an output buffer part adapted to convert the charge at the output node into a voltage signal corresponding to the amount of the charge, compare the voltage signal with a first reference signal, and output an active comparison result signal when the voltage signal and the first reference signal are at a same level; a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and a holding signal readout part disposed between an input node of the signal holding part and a feeding line of a second reference signal different from the first reference signal, conduction or non-conduction of the holding signal readout part being controlled depending on the comparison result signal outputted by the output buffer part. The method includes: applying two reference signals that have different slopes from each other to give different gradients between inputs of the two reference signals, the first reference signal that is one of the two reference signals being compared with the voltage signal, the second reference signal that is the other of the two reference signals being applied to a voltage holding signal; and, in the output buffer part, converting the charge at the output node into the voltage signal corresponding to the amount of the charge, comparing the voltage signal with the first reference signal, outputting the active comparison result signal to make the holding signal readout part in a conduction state when the voltage signal and the first reference signal are at the same level, and holding the second reference signal in the signal holding part while obtaining an effective voltage gain.

An electronic apparatus according to a third aspect of the invention includes a solid-state imaging device and an optical system for forming a subject image on the solid-state imaging device. The solid-state imaging device includes a pixel part having pixels arranged therein, each pixel being configured to perform photoelectric conversion. The each pixel includes: a photoelectric conversion element adapted to store therein, in an integration period, charge generated by photoelectric conversion; a transfer element adapted to transfer, in a transfer period following the integration period, the charge stored in the photoelectric conversion element; an output node to which the charge stored in the photoelectric conversion element is transferred through the transfer element; a reset element adapted to reset, in a reset period, the output node to a predetermined voltage; an output buffer part adapted to convert the charge at the output node into a voltage signal corresponding to the amount of the charge, compare the voltage signal with a first reference signal, and output an active comparison result signal when the voltage signal and the first reference signal are at a same level; a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and a holding signal readout part disposed between an input node of the signal holding part and a feeding line of a second reference signal different from the first reference signal, conduction or non-conduction of the holding signal readout part being controlled depending on the comparison result signal outputted by the output buffer part.

Advantageous Effects

According to the aspects of the invention, without increasing the capacitance of the voltage sample-and-hold signal holding capacitor, it is possible to achieve reduced noise at a voltage sample-and-hold node, thereby achieving a high pixel gain while keeping a low gain for a high-luminance optical signal in a high gain mode, accomplishing low conversion gain read-out in a low gain mode, and substantially realizing enhanced dynamic range and increased frame rate.

DESCRIPTION OF THE EMBODIMENTS

Embodiments of the present invention will be hereinafter described with reference to the drawings.

First Embodiment

Figure 1:
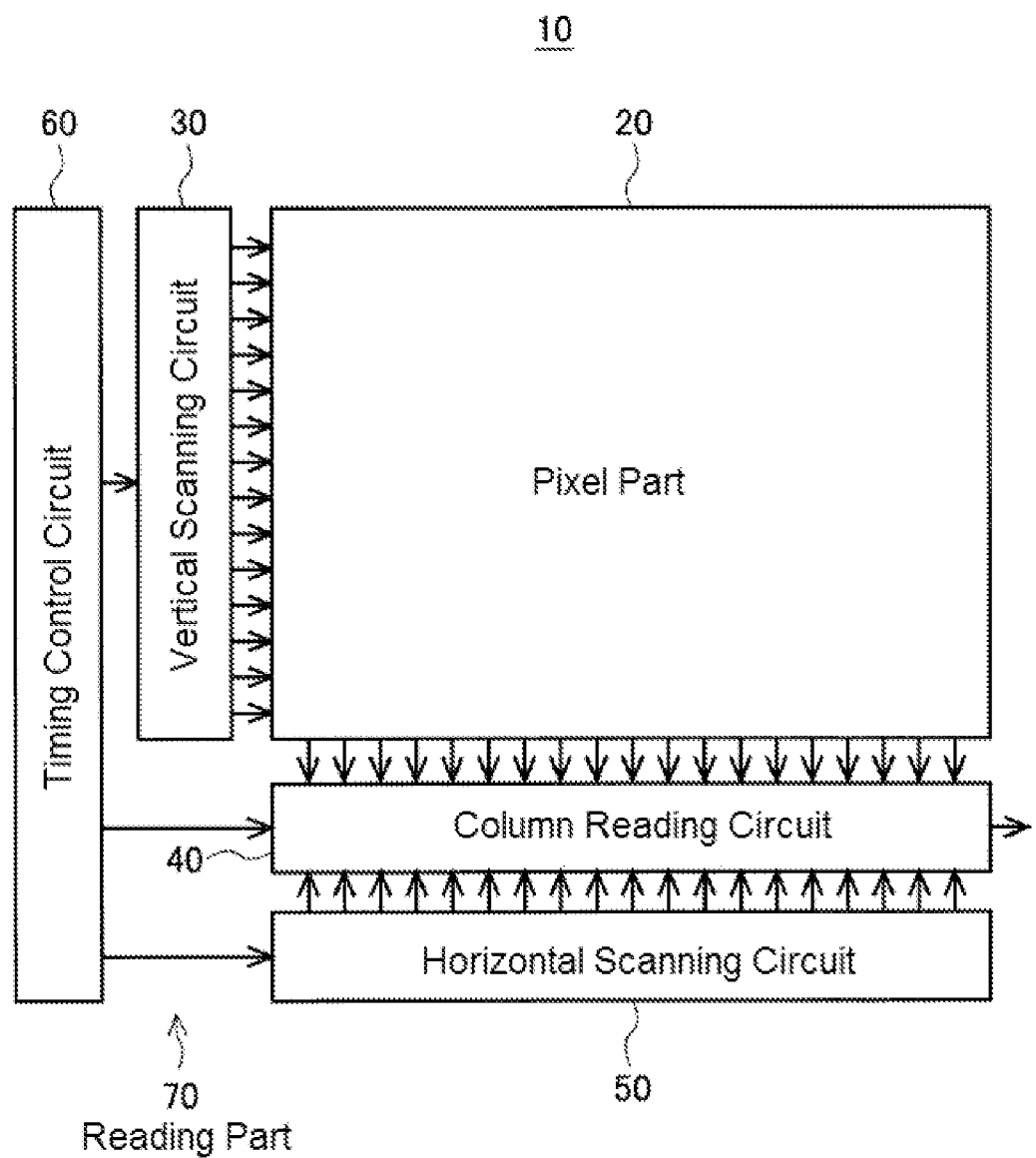
FIG. 1 is a block diagram showing an example configuration of a solid-state imaging device according to a first embodiment of the present invention.

FIG. 1 is a block diagram showing an example configuration of a solid-state imaging device according to a first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, and the timing control circuit 60 constitute a reading part 70 for reading pixel signals.

In the first embodiment, the solid-state imaging device 10 includes VMCS pixels as will be described in detail below. The VMCS pixel includes: an output node (floating diffusion FD) to which electric charge stored in a photoelectric conversion element (PD) is transferred through a transfer element; an output buffer part adapted to convert the charge at the output node into a voltage signal corresponding to the amount of the charge, compare the voltage signal with a first reference signal, and output an active comparison result signal when the voltage signal and the first reference signal are at the same level; a signal holding part including at least a sample-and-hold signal holding capacitor, the sample-and-hold signal holding capacitor being capable of holding a signal corresponding to the voltage signal corresponding to the amount of the charge at the output node and outputting the held signal; and a holding signal readout part disposed between an input node of the signal holding part and a feeding line of a second reference signal different from the first reference signal, conduction or non-conduction of the readout part being controlled depending on the comparison result signal outputted by the output buffer part. In the first embodiment, the first reference signal is a first ramp signal RAMP1 having first slopes CL1 and CL11. The second reference signal is a second ramp signal RAMP2 having second slopes CL2 and CL12 different from the first slopes CL1 and CL11. In the first embodiment, the gradient of the second slopes CL2 and CL12 are greater than the first slopes CL1 and CL12, respectively. In the first embodiment, the output buffer part has a comparator, which compares the converted voltage signal with the first reference signal. The output buffer part outputs an active comparison result signal SCMP when the voltage signal and the first reference signal are at the same level.

The basic concept of a VMCS pixel processing in the first embodiment is as follows. The first ramp signal RAMP1 is supplied to the comparator in the output buffer part, and a voltage signal VSL is converted to a digital signal by a signal slope ADC method. The second ramp signal RAMP2 is provided with the second slope different from the first slope of the first ramp signal RAMP1. The output of the comparator is used to hold (latch) the second ramp signal RAMP2. For example, the ratio of the first slope CL1 to the second slope CL2 (ratio of the gradients) "r" is expressed as r=CL2/CL1 (r=gradient of the second slope (gradient) CL2/ gradient of the first slope CL1). Since the slopes are different, it is possible to obtain a holding voltage (latch voltage) of a sample-and-hold signal holding capacitor corresponding to to the gain ratio of the slope between the first ramp signal RAMP1 and the second ramp signal RAMP2, which serves as the voltage gain. In a case of a noise dominated by the kT/C noise in the sample-and-hold signal holding capacitor, the effective input referred field noise can be suppressed to 1/r.

Thus, the solid-state imaging device 10 of the first embodiment is configured to be capable of, without increasing the capacitance of the voltage sample-and-hold signal holding capacitor, achieving reduced noise at a voltage sample-and-hold node, thereby achieving a high pixel gain while keeping a low gain for a high-luminance optical signal in a high gain mode, accomplishing low conversion gain read-out in a low gain mode, and substantially realizing enhanced dynamic range and increased frame rate.

The following outlines the configurations and functions of the parts of the solid-state imaging device 10. In particular, the configurations and functions of the VMSC pixels (hereinafter, may be referred simply as the pixels) in the pixel part 20 and the relating read-out operation will be described in detail, and other features will be also described in detail.

Figure 2:
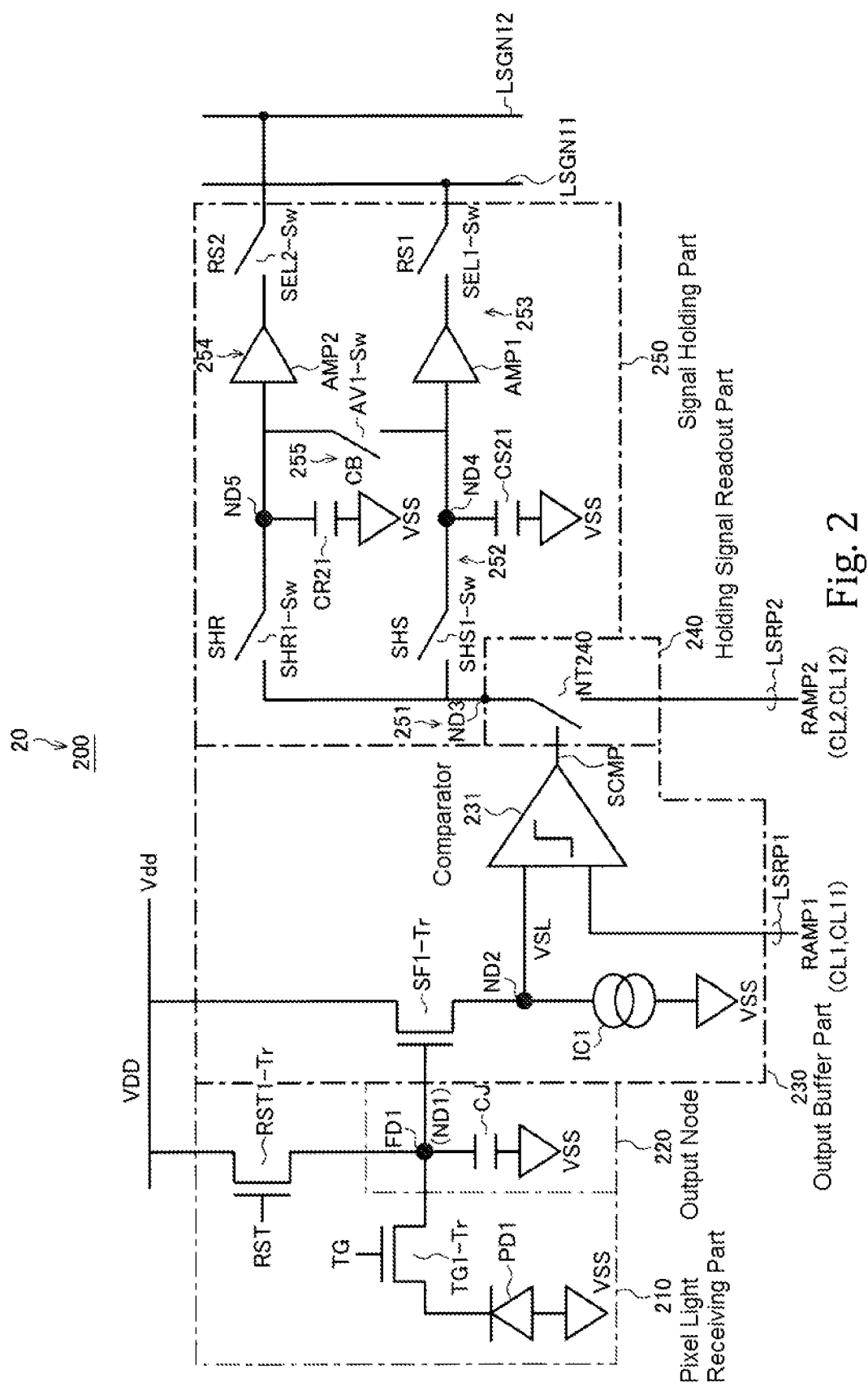
FIG. 2 is a circuit diagram showing an example of the pixels according to the first embodiment.

FIG. 2 is a circuit diagram showing an example of the pixels according to the first embodiment.

A pixel 200, which is disposed in the pixel part 20, includes a pixel light receiving part 210, a floating diffusion FD1 serving as an output node 220 (ND1), an output buffer part 230, a holding signal readout part 240, and a signal holding part 250.

The pixel light receiving part 210 of the pixel 200 includes, for example, a photodiode PD1 as a photoelectric conversion element, a transfer transistor TG1-Tr as a transfer element, and a reset transistor RST1-Tr as a reset element. In the pixel 200, for the photodiode PD1, one transfer transistor TG1-Tr, one reset transistor RST1-Tr, one source follower transistor SF1-Tr serving as a source follower element that is a component of the output buffer part 230, one current transistor IC1, one floating diffusion FD1 serving as the output node 220 (ND1), a comparator 231, and one readout node ND2 are provided. Note that the floating diffusion FD1 has a parasitic capacitance CJ.

The photodiode PD1 generates signal charge (electrons) in an amount determined by the amount of the incident light and stores the same. Description will be hereinafter given of a case where the signal charge are electrons and each transistor is an n-type transistor. However, it is also possible that the signal charge are holes or each transistor is a p-type transistor. Further, this embodiment is also applicable to the case where a plurality of photodiodes and transfer transistors share one or more transistors.

The photodiode (PD) in each pixel 200 is a pinned photodiode (PPD). On a substrate surface for forming the photodiodes (PDs), there is a surface level due to dangling bonds or other defects, and therefore, a lot of charge (dark current) are generated due to heat energy, so that signals fail to be read out correctly. In the case of a pinned photodiode (PPD), a charge storage part of the photodiode (PD) is buried in the substrate to reduce mixing of the dark current into signals.

The transfer transistor TG1-Tr of the pixel light receiving part 210 is connected between the photodiode PD1 and the floating diffusion FD1 and controlled by a control signal TG applied to the gate thereof through a control line. The transfer transistor TG1-Tr remains selected and in the conduction state during a transfer period PT in which the control signal TG is at the high (H) level, to transfer to the floating diffusion FD1 the charge (electrons) produced by the photoelectric conversion and then stored in the photodiode PD1. After the photodiode PD1 and floating diffusion FD1 are reset to a predetermined reset potential, the transfer transistor TG1-Tr becomes in the non-conducting state and the control signal TG is at a low (L) level, and the photodiode PD1 goes into an accumulation period PI.

The reset transistor RST1-Tr is connected between the power supply line Vdd of the power supply voltage VDD and the floating diffusion FD1 and controlled by a control signal RST applied to the gate thereof through a control line. The reset transistor RST1-Tr remains selected and in the conduction state during a reset period in which the control signal RST is at the H level, to reset the floating diffusion FD1 to the potential of the power supply line Vdd of the power supply voltage VDD.

The output buffer part 230 converts the charge in the floating diffusion FD1, which is the output node, into the voltage signal VSL corresponding to the amount of the charge, compares the voltage signal VSL with the first reference signal by the comparator 231, and outputs the active comparison result signal SCMP to the holding signal readout part 240 when the voltage signal reaches the same level as the first reference signal.

In the first embodiment, the source follower transistor SF1-Tr, current transistor IC1, the comparator 231, and the readout node ND2 together constitute the output buffer part 230.

In the first embodiment, the voltage signal VSL includes a readout reset signal (signal voltage) (VRST) and a readout signal (signal voltage) (VSIG) as pixel signals.

In the first embodiment, when the voltage signal VSL is the readout reset signal VTST, the first reference signal is the first ramp signal RAMP1 having the first slope CL1, and the second reference signal is the second ramp signal RAMP2 having the second slope CL2 different from the first slope CL1. In the first embodiment, the gradient of the second slope CL2 is greater than the first slope CL1.

When the voltage signal VSL is the readout signal VSIG, the first reference signal is the first ramp signal RAMP1 having the first slope CL11, and the second reference signal is the second ramp signal RAMP2 having the second slope CL12 different from the first slope CL11. In the first embodiment, the gradient of the second slope CL12 is greater than the first slope CL11. The gradient of the first slope CL11 in the case of the readout signal VSIG is greater than that of the first slope CL1 in the case of the readout reset signal VRST. Similarly, the gradient of the second slope CL12 in the case of the readout signal VSIG is greater than that of the second slope CL2 in the case of the readout reset signal VRST.

In the first embodiment, the output buffer part 230 includes the comparator 231. The comparator 231 compares the voltage signal VSL converted by the source follower transistor SF1-Tr with the first ramp signal RAMP1. When the voltage signal VSL and the first ramp signal RAMP1 becomes at the same level, the comparison result signal SCMP of active, for example, high level H (or low level L) is outputted to the control terminal of the holding signal readout part 240.

The source follower transistor SF1-Tr serving as a source follower element is connected at the source thereof to the reading node ND2, at the drain thereof to the power supply line Vdd, and at the gate thereof to the floating diffusion FD1. The current transistor IC1-Tr is connected between the readout node ND2 and the reference voltage VSS (for example, GND). The readout node ND2 is connected to the inverting input terminal (−), which is one of the two input terminals of the comparator 231. A non-inverting input terminal (+) of the comparator 231, which is the other of the two input terminals, is connected to the supply line LSRP1 of the first ramp signal RAMP1 serving as the first reference signal.

The comparator 231 compares the voltage signal VSL with the first ramp signal RAMP1, and inverts the output level of the comparison result signal SCMP from an inactive level (e.g., low level) to an active level (high level) when the voltage signal VSL and the first ramp signal RAMP1 become the same level.

Example Configuration of Comparator 231

The comparator 231 of the first embodiment includes a differential transistor pair in which the signal voltage VSL is supplied to a gate of one transistor and the first ramp signal RAMP1 as the first reference signal is supplied to a gate of the other transistor and performs comparison between the signal voltage VSL and the first ramp signal RAMP; and an active load circuit connected to a drain of the one transistor and a drain of the other transistor to form a current mirror.

Figure 3:
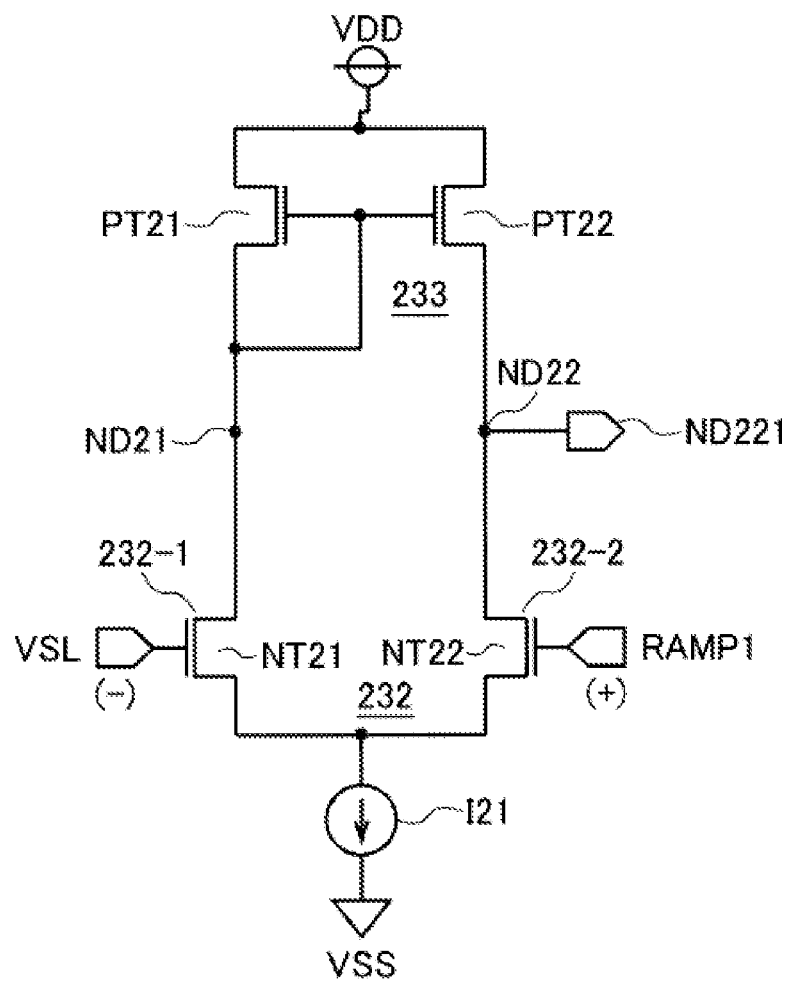
FIG. 3 is a circuit diagram showing an example configuration of a comparator included in an output buffer part relating to the first embodiment.

FIG. 3 is a circuit diagram showing an example configuration of the comparator included in the output buffer part relating to the first embodiment.

The comparator 231 of FIG. 3 includes PMOS transistors PT21 and PT22, NMOS transistors NT21 and NT22, a current source 121, and nodes ND21 and ND22.

The source of the PMOS transistor PT21 and the source of the PMOS transistor PT22 are connected to each other, and the connection node therebetween is connected to the power supply voltage VDD. The source of the NMOS transistor NT21 and the source of the NMOS transistor NT22 are connected to each other, and the connection node therebetween is connected to the reference voltage VSS and to the current source 121.

The drain of the PMOS transistor PT21 is connected to the drain of the NMOS transistor NT21, and the connecting point therebetween forms the node ND21. The drain of the PMOS transistor PT22 is connected to the drain of the NMOS transistor NT22, and the connecting point therebetween forms the node ND22. The node ND21 is connected to the gates of the PMOS transistors PT21, PT22, and the node ND22 is connected to an output node ND221.

Of these components, the NMOS transistors NT21 and NT22, which are connected source to source, form a differential transistor pair 232. One transistor 232-1 of the pair is the NMOS transistor NT21, and the other transistor 232-2 of the pair is the NMOS transistor NT22. The voltage signal VSL is supplied to the gate of the NMOS transistor NT21 that is the one transistor 232-1, and the first reference voltage as the ramp signal RAMP1 is supplied to the gate of the NMOS transistor NT22 that is the other transistor 232-2.

An active load circuit 233 in which the PMOS transistor PT21 and the PMOS transistor PT22 form a current mirror is provided on the drain side of the NMOS transistor NT21 that is the one transistor and on the drain side of the NMOS transistor NT22 that is the other transistor.

In the comparator 231 having this configuration, a connection node ND22 between the drain of the NMOS transistor NT22 that is the other transistor and the drain of the PMOS transistor PT22 forming the active load circuit 233 is connected to the output node ND221 of the comparison result signal SCMP. In other words, the comparator 231 outputs the comparison result signal SCMP from the drain side of the NMOS transistor NT22 that is the other transistor.

The holding signal readout part 240 is disposed between an input node ND3 of the signal holding part 250 and a feeding line LSRP2 of the second ramp signal RAMP2, which is the second reference signal different from the first ramp signal RMP1 or the first reference signal. A conduction state or non-conduction state of the holding signal readout part 240 is controlled depending on the comparison result signal SCMP outputted by the output buffer part 230. In the first embodiment, the holding signal readout part 240 is formed of an NMOS transistor NT240, for example.

In the pixel 200 of the first embodiment, the comparator 231 of the output buffer part 230 is connected to the gate of the NMOS transistor NT240, which is the switch control terminal of the holding signal readout part 240. One source drain, which is the input terminal of the holding signal readout part 240, is connected to the feeding line LSRP2 of the second ramp signal RAMP2, and the other source drain, which is the output terminal of the holding signal readout part 240, is connected to input node ND3, which is the input of the signal holding part 250.

When the voltage signal VSL is the readout reset signal VRST, the second ramp signal RAMP2 has the second slope CL2 different from the slope CL1 of the first ramp signal RAMP1. When the voltage signal VSL is the readout signal VSIG, the second ramp signal RAMP2 has the second slope CL12 different from the slope CL11 of the first ramp signal RAMP1. The second ramp signal RAMP2 has a gradient different from that of the first ramp signal RAMP1. In the first embodiment, the gradient of the second slope CL2 is greater than the first slope CL1. Similarly, the gradient of the second slope CL12 is greater than the first slope CL11.

Output of the comparator 231 is used to hold (latch) the second ramp signal RAMP2. The ratio of the first slope CL1 to the second slope CL2 (ratio of the gradients) "r" is expressed as r=CL2/CL1 (r=gradient of the second slope (gradient) CL2/gradient of the first slope CL1). The ratio of the first slope CL11 to the second slope CL12 (ratio of the gradients) "r" is expressed as r=CL12/CL11 (r=gradient of the second slope (gradient) CL2/gradient of the first slope CL1). Since the slopes are different, it is possible to obtain a holding voltage (latch voltage) of a sample-and-hold signal holding capacitor corresponding to to the gain ratio of the slope between the first ramp signal RAMP1 and the second ramp signal RAMP2, which serves as the voltage gain.

The signal retaining part 250 of the pixel 200 basically includes an input part 251 including the input node ND3, a sample-and-hold part 252, a first output part 253, a second output part 254, an averaging part 255, and holding nodes ND4 and ND5.

In the input part 251, the input node ND3 is connected to the output terminal of the holding signal readout part 240, and the sample-and-hold part 252 is supplied with the readout reset signal (VRST1) read from the holding signal readout part 240 and the second ramp signal RAMP2 serving as the readout signal (VSIG1) in synchronization with the first ramp signal RAMP1.

The sample-and-hold part 252 includes a first sampling switch (for example, a sampling transistor formed by an NMOS transistor) SHS1-Sw serving as a first switch element, a second sampling transistor (for example, a sampling transistor formed by an NMOS transistor) SHR1-Sw serving as a second switch element, a first signal holding capacitor CS21 and a second signal holding capacitor CR21.

The first sampling switch SHS1-Tr is connected between the holding node ND4 and the input node ND3 connected to the holding signal readout part 240. During a global shutter period or clear period of the signal holding capacitor, the first sampling switch SHS1-Sw keeps the first signal holding capacitor CS21 of the sample-and-hold part 252 selectively connected to the output terminal of the second ramp signal RAM of the holding signal readout part 240 via the holding node ND4. The first sampling switch SHS1-Sw is in the conduction state during a period in which, for example, a control signal SHS is at the high level. The first signal holding capacitor CS21 is connected between the holding node ND4 and the reference voltage VSS.

The second sampling switch SHR1-Sw is connected between the holding node ND5 and the input node ND4 connected to the holding signal readout part 240. During the global shutter period or clear period of the signal holding capacitor, the second sampling switch SHR1-Sw keeps the second signal holding capacitor CR21 of the sample-and-hold part 252 selectively connected to the output terminal of the second ramp signal RAM of the holding signal readout part 240 via the holding node ND5. The second sampling switch SHR1-Sw is in the conduction state during a period in which, for example, the control signal SHR is at the high level. The second signal holding capacitor CR21 is connected between the holding node ND5 and the reference voltage VSS.

The first sampling switch SHS1-Sw and the second sampling switch SHR1-Sw are formed by a MOS transistor, for example, an NMOS transistor.

The first output part 253 includes a first amplifier AMP1 for basically amplifying and outputting the signal held in the first signal holding capacitor CS21 at a level determined by the held voltage in the global shutter period, and a first selection switch SEL1-Sw for selectively outputting the signal amplified by the first amplifier AMP1 to a first vertical signal line LSGN11, which is configured to be driven by a constant current source Ibias.

The first amplifier AMP1 and the first selection switch SEL1-Sw are connected in series between the holding node ND4 and the first vertical signal line LSGN11.

The first selection switch SEL1-Sw is controlled by a control signal RS1 applied to the gate thereof through a control line. The first selection switch SEL1-Sw remains selected and in the conduction state during a selection period in which the control signal RS1 is at the H level. In this way, the first amplifier AMP1 outputs, to the first vertical signal line LSGN11, read-out voltage (VSIG) of a column output corresponding to the voltage held in the first signal holding capacitor CS21.

The second output part 254 includes a second amplifier AMP2 for basically amplifying and outputting the signal held in the second signal holding capacitor CR21 at a level determined by the held voltage in the global shutter period, and a second selection switch SEL2-Sw for selectively outputting the signal amplified by the second amplifier AMP2 to a second vertical signal line LSGN12, which is configured to be driven by the constant current source Ibias.

The second amplifier AMP2 and the second selection switch SEL2-Sw are connected in series between the holding node ND5 and the second vertical signal line LSGN12.

The second selection switch SEL2-Sw is controlled by a control signal RS2 applied to the gate thereof through a control line. The second selection switch SEL2-Sw remains selected and in the conduction state during a selection period in which the control signal RS2 is at the H level. In this way, the second amplifier AMP2 outputs, to the second vertical signal line LSGN12, read-out voltage (VSIG) of a column output corresponding to the voltage held in the second signal holding capacitor CS21.

The averaging part 255 is constituted by an averaging switch AV1-Sw serving as an averaging part connected between the holding node ND4 and the holding node ND5. A control signal CB is supplied to the gate of the averaging switch AV1-Sw.

The control signal CB is supplied at the H level after reading of the readout signal VSIG held in the first signal holding capacitor CS21 is performed in parallel with differential reading of the readout reset signal VRST held in the second signal holding capacitor CR21. After this, differential reading of the averaged signals via the first and second output parts 253 and 254 is also performed in parallel.

As described above, in the solid-state imaging device 10 relating to the first embodiment, in the voltage mode, the pixel signal is sampled into the signal holding part 250 serving as a pixel signal storage, which takes place in all of the pixels at the same time. The converted signals corresponding to the readout signal VSIG held in the first signal holding capacitor CS21 and the second signal holding capacitor CR21 are read out to the first vertical signal line LSGN21, and concurrently the converted signals corresponding to the readout reset signal VRST are read out to the second vertical signal line LSGN22, and these differential signals are fed to the column reading circuit 40.

Since the pixel part 20 includes the pixels 200 (PXL) arranged in N rows and M columns, there are N control lines LSEL, LRST, LTG, and LFB, respectively, and 2×M vertical signal lines LSGN11 and LSGN12, respectively. In FIG. 1, the control lines LSEL, LRST, LTG, LSG are represented as one row-scanning control line. Similarly, the vertical signal lines LSGN11 and LSGN12 are represented as one vertical signal line.

The vertical scanning circuit 30 drives the pixels in shutter and readout rows through the row-scanning control lines under control of the timing control circuit 60. Further, the vertical scanning circuit 30 outputs, according to an address signal, row selection signals indicating the row addresses of the reading row from which signals are to be read out and the shutter row in which the charge stored in the photodiodes PD are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel.

The column reading circuit 40 relating to the first embodiment includes amplifiers (AMP) and sampling (S/H) circuits. The column reading circuit 40 may include a correlated double sampling (CDS) circuit, and the like.

The horizontal scanning circuit 50 scans the signals processed in the plurality of column signal processing circuits of the reading circuit 40 such as ADCs, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

<Read-Out Operation in Solid-State Imaging Device 10>

The above has described the characteristic configurations and functions of the parts of the solid-state imaging device 10. The following now describes readout operation of the solid-state imaging device 10 relating to the first embodiment.

Figure 4:
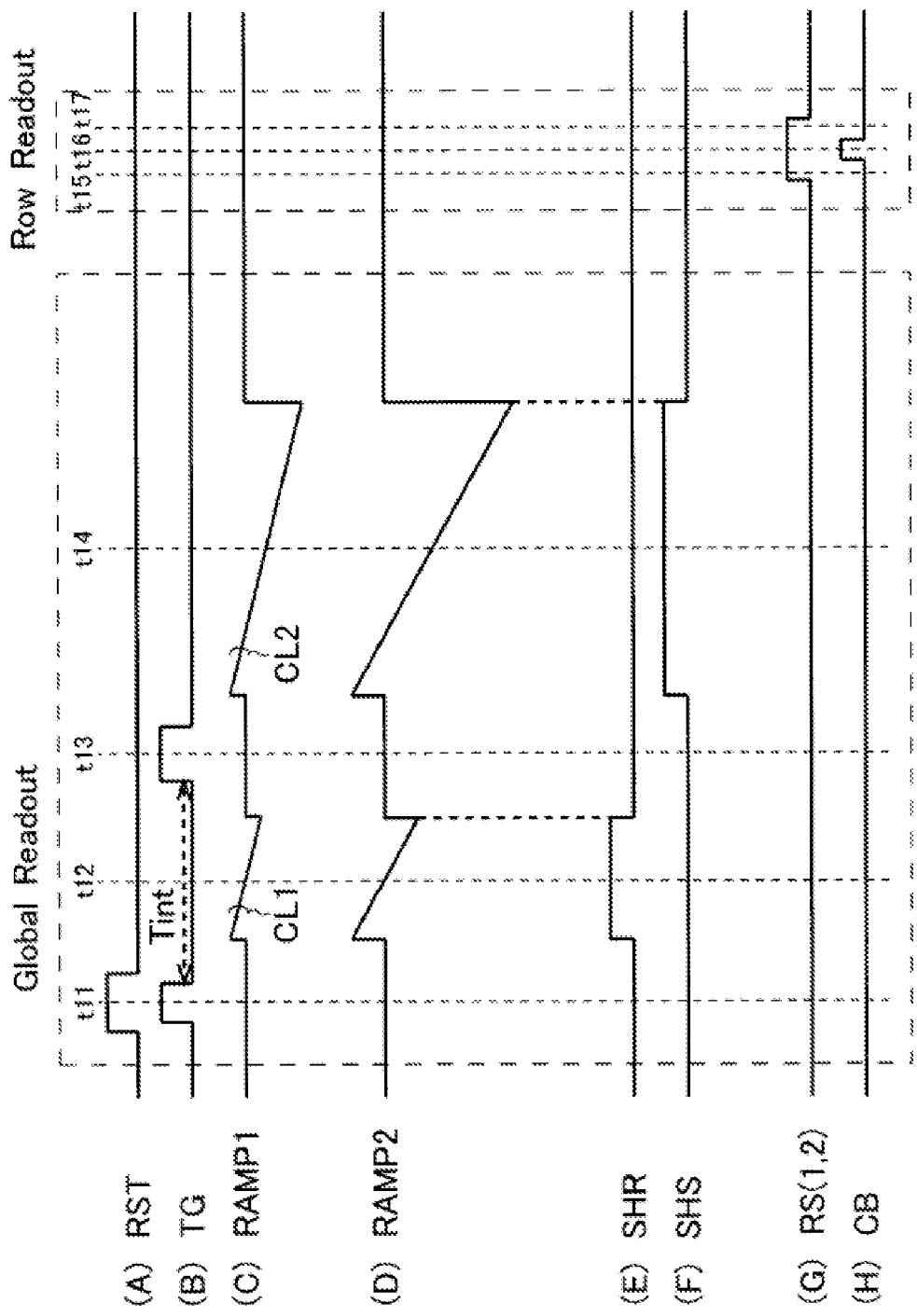
FIG. 4 is a timing chart to illustrate a reading operation performed by a pixel part in the solid-state imaging device relating to the first embodiment of the present invention.

FIG. 4 is a timing chart to illustrate the readout operation performed in the pixel part of the solid-state imaging device relating to the first embodiment of the invention.

In FIG. 4, the part (A) shows the control signal RST for the reset transistor RST1-Tr of the pixel light receiving part 210 of the pixel 200. In FIG. 4, the part (B) shows the control signal TG for the transfer transistor TG1-Tr of the pixel light receiving part 210 of the pixel 200. In FIG. 4, the part (C) shows the first ramp signal RAMP1 supplied to the comparator 231. In FIG. 4, the part (D) shows the second ramp signal RAMP2 supplied to the holding signal readout part 240. In FIG. 4, the part (E) shows the control signal SHR for the second sampling switch SHR1-Sw of the signal holding part 250 of the pixel 200. In FIG. 4, the part (F) shows the control signal SHS for the first sampling switch SHS1-Sw of the signal holding part 250 of the pixel 200. In FIG. 4, the part (G) shows the control signals RS for the selection switches SEL1-Sw and SEL2-Sw of the signal holding part 250 of the pixel 200. In FIG. 4, the part (H) shows the control signal CB for the averaging switch AV1-Sw of the signal holding part 250 of the pixel 200.

At the time of the global shutter mode, the pixel array is active and ready to output the second ramp signal RAMP2, which is the voltage signal, from the holding signal readout part 240 to the signal holding part 250 depending on the comparison result of the comparator 231 between the first ramp signal RAMP1 and the voltage signal VSL corresponding to the amount of charge in the output node ND1.

In FIG. 4, the period starting at the timing t11 and ending at the timing t12 denotes the period Tint of resetting and storing charge in the photodiodes PD21 and the floating diffusions FD21, which serves as the output node ND, in all of the pixel light receiving parts 210 in the pixel array.

During this reset period, the control signal SHS for the first sampling switch SHS1-Sw, the control signal SHR for the second sampling switch SHR1-Sw, the control signal CB for the averaging switch AV1-Sw, and the control signals RS1 and RS2 for the selection switches SWL1-Sw and SEL2-Sw are set at the L level, so that the first sampling switch SHS1-Sw, the second sampling switch SHR1-Sw, the averaging switch AV1-Sw, and the selection switches SEL1-Sw and SEL2-Sw are controlled to be in the non-conduction state.

While these states are maintained, in the reset period, the reset transistor RST1-Tr is selected and becomes in the conduction state during the period in which the control signal RST is at the H level. While the control signal RST remains at the H level, the transfer transistor TG1-Tr remains selected and in the conduction state during the period in which the control signal TG is at the H level, so that the node at which the charge (electrons) obtained by the photoelectric conversion in the photodiode PD1 are stored is in the conduction state with the floating diffusion FD1 which serves as the output node ND1. This resets the photodiode PD1 and the floating diffusion FD1 to the voltage of the power supply line Vdd.

After the photodiode PD1 is reset, the control signal TG for the transfer transistor TG1-Tr is switched to the L level, so that the transfer transistor TG1-Tr is brought into the non-conduction state, and the charge obtained by the photoelectric conversion start to be stored in the photodiode PD1. To do so, the control signal RST for the reset transistor RST1-Tr is kept at the H level, so that the floating diffusion FD1 is kept being reset to the voltage of the power supply line Vdd. Subsequently, to end the reset period, the control signal RST for the reset transistor RST1-Tr is switched to the L level, so that the reset transistor RST1-Tr is brought into the non-conduction state.

At the timing of the switching of the control signal RST for the reset transistor RST1-Tr to the L level, the control signals SHS and SHR for the first and second sampling switches SHS1-Sw and SHR1-Sw are at the L level. Following the end of the reset period, the following control is performed in all of the signal holding parts 250 of the pixel array. Specifically, in the signal holding part 250, the control signal SHR21 is switched to and remains at the H level for a predetermined period including the timing t12, so that the second sampling switch SHR1-Sw is switched into and stays in the conduction state.

In this manner, at the timing t12, in the output buffer part 230, the charge in the floating diffusion FD11 serving as the output node is converted by the source follower transistor SF1-TR into the voltage signal VRST at a level corresponding to the amount of charge, and the voltage signal VRST is fed to the comparator 231.

The comparator 231 compares the voltage signal VRST converted by the source follower transistor SF1-Tr with the first ramp signal RAMP1 having the first slope CL1. When the voltage signal VRST and the first ramp signal RAMP1 become at the same level, the comparator 231 outputs, an active, e.g., high level H, comparison result signal SCMP to the control terminal of the holding signal readout part 240.

Upon receipt of the active comparison result signal SCMP, the holding signal readout part 240 becomes the conducting state, and the second ramp signal RAMP2 having the second slope CL2 greater than the first slope CL1 is supplied to the input part 251 of the signal holding part 250 and held in the second signal holding capacitor CR21 through the second sampling switch SHR1-Sw.

After the read-out signal VRST is held in the second signal holding capacitor CR21, the control signal SHR is switched to the L level, so that the second sampling switch SHR1-Sw is brought into the non-conduction state.

This series of steps for holding the voltage signal VRST is performed as follows in summary. The first ramp signal RAMP1 is supplied to the comparator 231 in the output buffer part 230, and the voltage signal VSL (VRST) is converted to a digital signal by the signal slope ADC method. The second ramp signal RAMP2 is provided with the second slope CL2 different from the first slope CL1 of the first ramp signal RAMP1. Output of the comparator 231 is used to hold (latch) the second ramp signal RAMP2. The ratio of the first slope CL1 to the second slope CL2 (ratio of the gradients) "r" is expressed as r=CL2/CL1 (r=gradient of the second slope (gradient) CL2/gradient of the first slope CL1). Since the slopes are different, it is possible to obtain the holding voltage (latch voltage) of the sample-and-hold signal holding capacitor CR21 corresponding to to the gain ratio of the slope between the first ramp signal RAMP1 and the second ramp signal RAMP2, which serves as the voltage gain. In the case of a noise dominated by the kT/C noise in the sample-and-hold signal holding capacitor CR21, the effective input referred field noise can be suppressed to 1/r.

Here, a predetermined period of time including the timing t13 is referred to as the transfer period. In the transfer period, the transfer transistor TG1-Tr in each pixel light receiving part 210 remains selected and in the conduction state during a period in which the control signal TG is at the H level, so that the charge (electrons) produced by the photoelectric conversion and then stored in the photodiode PD1 are transferred to the floating diffusion FD1. After the transfer period ends, the control signal TG for the transfer transistor TG1-Tr is switched to the L level, so that the transfer transistor TG1-Tr is brought into the non-conduction state.

In all of the signal holding parts 250, the following control is performed. Specifically, in the signal holding part 250, the control signal SHS is switched to and remains at the H level for a predetermined period including the timing t14, so that the first sampling switch SHS1-Sw is switched into and stays in the conduction state.

In this manner, at the timing t14, in the output buffer part 230, the charge in the floating diffusion FD1 serving as the output node is converted by the source follower transistor SF1-TR into the voltage signal VSIG at a level corresponding to the amount of charge, and the voltage signal VSIG is fed to the comparator 231.

The comparator 231 compares the voltage signal VSIG converted by the source follower transistor SF1-Tr with the first ramp signal RAMP1 having the first slope CL11. When the voltage signal VSIG and the first ramp signal RAMP1 become at the same level, the comparator 231 outputs, an active, e.g., high level H, comparison result signal SCMP to the control terminal of the holding signal readout part 240.

Upon receipt of the active comparison result signal SCMP, the holding signal readout part 240 becomes the conducting state, and the second ramp signal RAMP2 having the second slope CL12 greater than the first slope CL11 is supplied to the input part 251 of the signal holding part 250 and held in the first signal holding capacitor CS21 through the first sampling switch SHS1-Sw.

After the readout signal VSIG is held in the first signal holding capacitor CS21, the control signal SHS is switched to the L level, so that the first sampling switch SHS1-Sw is brought into the non-conduction state.

This series of steps for holding the voltage signal VSIG is performed as follows in summary. The first ramp signal RAMP1 is supplied to the comparator 231 in the output buffer part 230, and the voltage signal VSL (VSIG) is converted into a digital signal by the signal slope ADC method. The second ramp signal RAMP2 is provided with the second slope CL12 different from the first slope CL11 of the first ramp signal RAMP1. Output of the comparator 231 is used to hold (latch) the second ramp signal RAMP2. The ratio of the first slope CL11 to the second slope CL12 (ratio of the gradients) "r" is expressed as r=CL12/CL11 (r=gradient of the second slope (gradient) CL12/gradient of the first slope CL11). Since the slopes are different, it is possible to obtain a holding voltage (latch voltage) of the sample-and-hold signal holding capacitor CS21 corresponding to to the gain ratio of the slope between the first ramp signal RAMP1 and the second ramp signal RAMP2, which serves as the voltage gain. In the case of a noise dominated by the kT/C noise in the sample-and-hold signal holding capacitor CS21, the effective input referred field noise can be suppressed to 1/r.

In order to read the held signal, a given one of the rows in the pixel array is selected. To make such a selection, the control signals RS1, RS2 for the selection switches SEL1-Sw and SEL2-Sw in the selected row are set to the H level, so that these selection switches SEL1-Sw and SEL2-Sw are brought into the conduction state. At the timing t15, reading of the readout signal VSIG held in the first signal holding capacitor CS21 and reading of the readout reset signal VRST held in the second signal holding capacitor CR21 are performed in parallel.

Here, in each signal holding part 250, the first amplifier AMP1 connected to the holding node ND4 outputs, to the first vertical signal line LSGN11, the readout signal VSIG of a column output at a level corresponding to the voltage held in the first signal holding capacitor CS21 connected to the holding node ND4. The readout signal VSIG is fed to the reading circuit 40 as a differential signal. At this point, in each signal holding part 250, the second amplifier AMP2 connected to the holding node ND5 outputs, to the second vertical signal line LSGN12, the readout reset signal VRST of a column output at a level corresponding to the voltage held in the second signal holding capacitor CR21 connected to the holding node ND5. The readout signal VRST is fed to the reading circuit 40 as a differential signal.

After this, in the signal holding part 250, during a predetermined period of time including the timing t16, the control signal CB remains at the H level, so that the averaging switch AV1-Sw becomes in the conduction state. This can average the reset level and the signal level for the selected row. After the control signal CB is switched to the L level, the readout signal VSIG held in the first signal holding capacitor CS21 and the readout reset signal VRST held in the second signal holding capacitor CR21 are averaged and the signals are read in parallel.

In each signal holding part 250, the first amplifier AMP1 connected to the holding node ND4 outputs an averaged signal of a column output to the first vertical signal line LSGN11 at a level corresponding to the averaged voltage at the holding node ND4. The averaged signal is fed to the column reading circuit 40. In parallel, in each signal holding part 250, the second amplifier AMP2 connected to the holding node ND5 outputs an averaged signal of a column output to the second vertical signal line LSGN12 at a level corresponding to the averaged voltage at the holding node ND5. The averaged signal is fed to the column reading circuit 40.

As described above, in the first embodiment, the solid-state imaging device 10 includes the VMCS pixels. The VMCS pixel includes: the output node 220 (ND1, floating diffusion FD1) to which electric charge stored in the photoelectric conversion element (PD1) is transferred through the transfer element; the output buffer part 230 adapted to convert the charge at the output node ND1 into a voltage signal corresponding to the amount of the charge, compare the voltage signal with the first reference signal, and output the active comparison result signal when the voltage signal and the first reference signal are the same level; a signal holding part 250 including at least sample-and-hold signal holding capacitors CR21 and CS21 that can each hold a signal corresponding to the voltage signal corresponding to the amount of the charge at the output node and can output the held signal; and the holding signal readout part 240 disposed between the input node of the signal holding part 250 and the feeding line of the second reference signal different from the first reference signal, conduction or non-conduction of the holding signal readout part 240 being controlled depending on the comparison result signal outputted by the output buffer part. In the first embodiment, the first reference signal is a first ramp signal RAMP1 having first slopes CL1 and CL11. The second reference signal is a second ramp signal RAMP2 having second slopes CL2 and CL12 different from the first slopes CL1 and CL11. In the first embodiment, the gradient of the second slopes CL2 and CL12 are greater than the first slopes CL1 and CL12, respectively. In the first embodiment, the output buffer part 230 has the comparator 231, which compares the converted voltage signal with the first reference signal. When the voltage signal and the first reference signal are at the same level, the active comparison result signal CMP is outputted.

The basic concept of a VMCS pixel processing in the first embodiment is as follows. The first ramp signal RAMP1 is supplied to the comparator 231 in the output buffer part, and the voltage signal VSL is converted to a digital signal by the signal slope ADC method. The second ramp signal RAMP2 is provided with the second slope different from the first slope of the first ramp signal RAMP1. The output of the comparator is used to hold (latch) the second ramp signal RAMP2. For example, the ratio of the first slope CL1 to the second slope CL2 (ratio of the gradients) "r" is expressed as r=CL2/CL1 (r=gradient of the second slope (gradient) CL2/gradient of the first slope CL1). Since the slopes are different, it is possible to obtain a holding voltage (latch voltage) of a sample-and-hold signal holding capacitor corresponding to to the gain ratio of the slope between the first ramp signal RAMP1 and the second ramp signal RAMP2, which serves as the voltage gain. In the case of a noise dominated by the kT/C noise in the sample-and-hold signal holding capacitor, the effective input referred field noise can be suppressed to 1/r.

As described above, the solid-state imaging device 10 of the first embodiment uses the two ramp signals RAMP1 and RAMP2 whose slopes (gradients) are different from each other. One of the two ramp signals, the first ramp signal RAMP1 is compared with the signal voltage VSL, and the other of the two ramp signals, the second ramp signal RAMP2 is applied to the voltage holding signal (latch signal). By providing the different slopes (gradients) between the ramp inputs, the effective voltage gain can be obtained, so that the input referred electric noise at the sample-and-hold (SH) node can be reduced to 1/G, where G is the gain. Thus, the solid-state imaging device 10 of the first embodiment is configured to be capable of, without increasing the capacitance of the voltage sample-and-hold signal holding capacitor, achieving reduced noise at a voltage sample-and-hold node, thereby achieving a high pixel gain while keeping a low gain for a high-luminance optical signal in a high gain mode, accomplishing low conversion gain read-out in a low gain mode, and substantially realizing enhanced dynamic range and increased frame rate.

Second Embodiment

Figure 5:
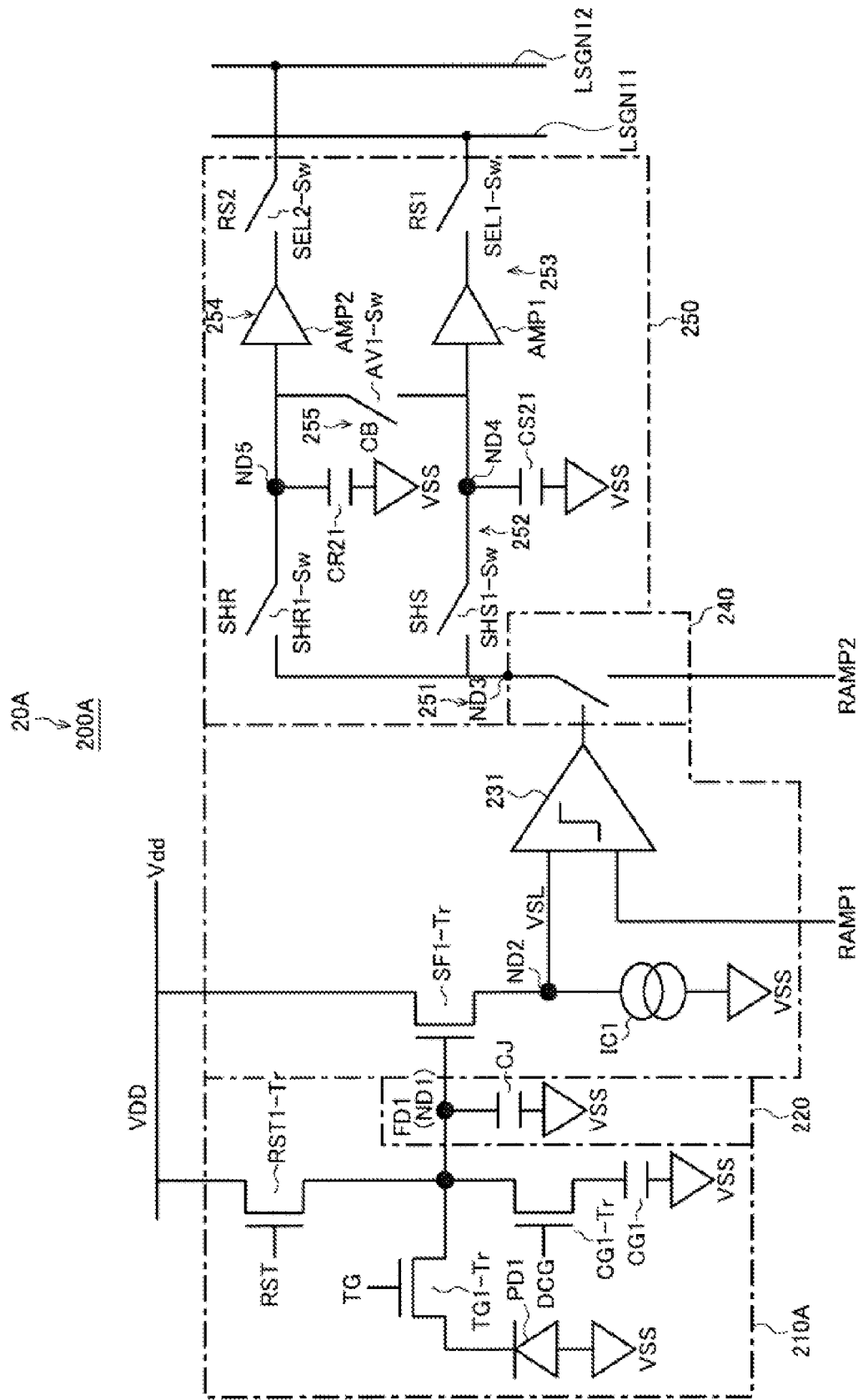
FIG. 5 shows an example configuration of a pixel according to a second embodiment of the present invention.

FIG. 5 shows an example configuration of a pixel relating to a second embodiment of the present invention.

A pixel 200A of the second embodiment differs from the pixel 200 of the first embodiment in the following points. The pixel 200A relating to the second embodiment further includes, in a pixel light receiving part 210A, a storage transistor CG1-Tr connected to the floating diffusion FD1 serving as the output node, and a storage capacitor element CG1 configured to store at least the charge at the output node ND1 via the storage transistor CG1-Tr, in order to provide for a plurality of conversion gains and achieve increased dynamic range. In this second embodiment, the storage transistor CG1-Tr and the storage capacitor element CG1 are connected in series between the floating diffusion FD1 serving as the output node ND1 and the reference voltage VSS.

Since the circuit including the storage transistor CG1-Tr and storage capacitor element CG1 connected in series are arranged between the floating diffusion FD1 and the reference voltage VSS, a plurality of different gains (at least high and low gains) can be realized. In this way, further improved dynamic range can be achieved. Further gain ranges can then be obtained by combining the so-called ramp gain function and pixel conversion gains.

Third Embodiment

Figure 6:
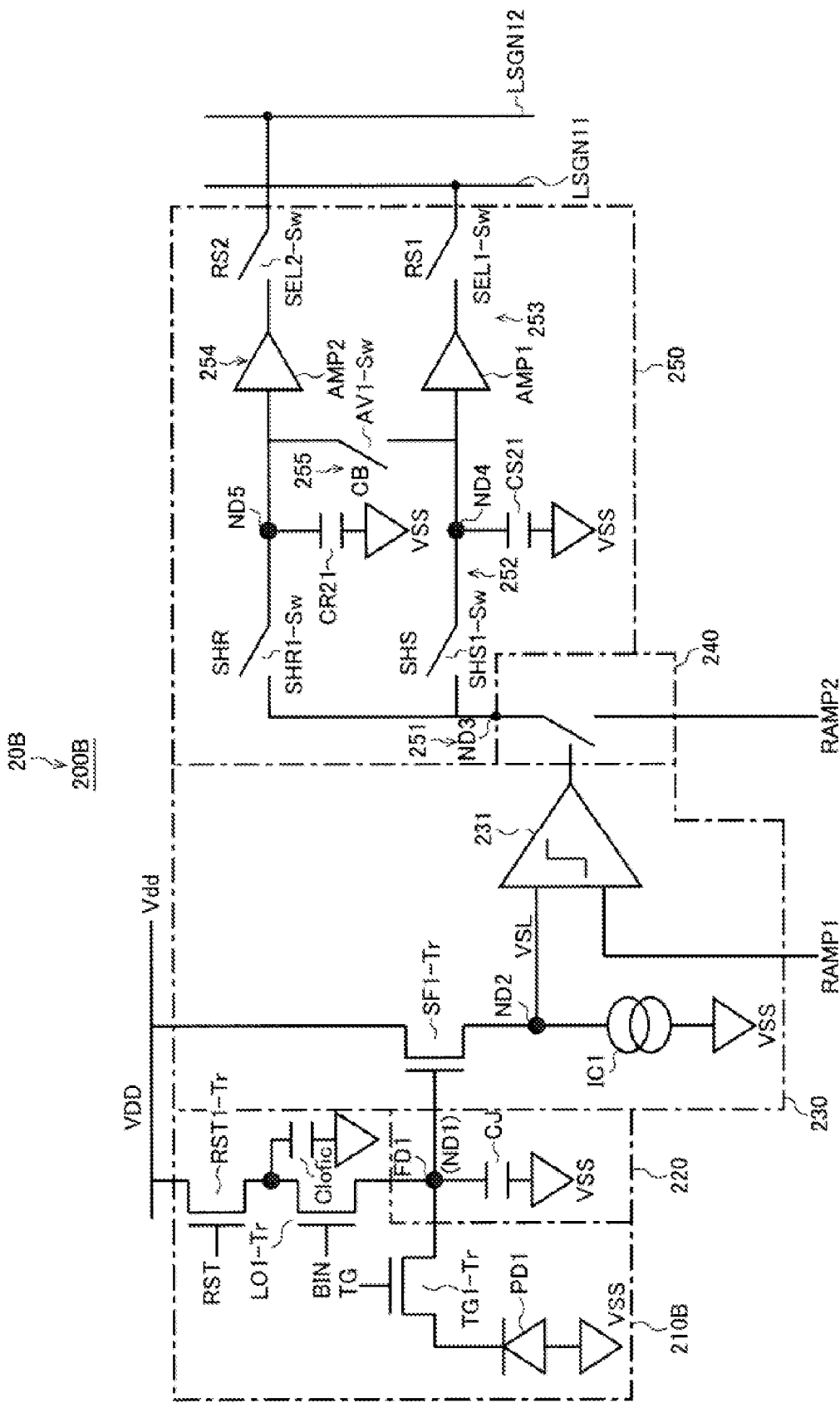
FIG. 6 shows an example configuration of a pixel according to a third embodiment of the present invention.

FIG. 6 shows an example configuration of a pixel relating to a third embodiment of the present invention.

A pixel 200B of the third embodiment differs from the pixel 200 of the first embodiment in the following points. Similar to the second embodiment described above, the pixel 200B relating to the third embodiment further includes an LOFIC circuit, which includes a storage transistor LO1-Tr connected to the floating diffusion FD1 serving as the output node, and a storage capacitor element Clofic configured to store at least the charge at the output node ND1 via the storage transistor LO1-Tr, in order to provide for a plurality of conversion gains and achieve increased dynamic range. The LOFIC circuit corresponds to a circuit that can selectively add a given capacitance to the capacitance Cfd1 of the floating diffusion FD1. In this third embodiment, the storage transistor LO1-Tr is connected between the output node ND1 and the reset transistor RST1-Tr, and the storage capacitor element Clofic is connected between the reference voltage VSS and the connection point of the storage transistor LO1-Tr and the reset transistor RST1-Tr.

As described above, the storage transistor LO1-Tr is connected between the output node ND1 and the reset transistor RST1-Tr, and the storage capacitor element Clofic is connected between the reference voltage VSS and the connection point of the storage transistor LO1-Tr and the reset transistor RST1-Tr to form an LOFIC circuit. By adding the LOFIC circuit, it is possible to have several different gains (at least high and low gains). In this way, further improved dynamic range can be achieved. Further gain ranges can then be obtained by combining the so-called ramp gain function and pixel conversion gains.

Fourth Embodiment

Figure 7:
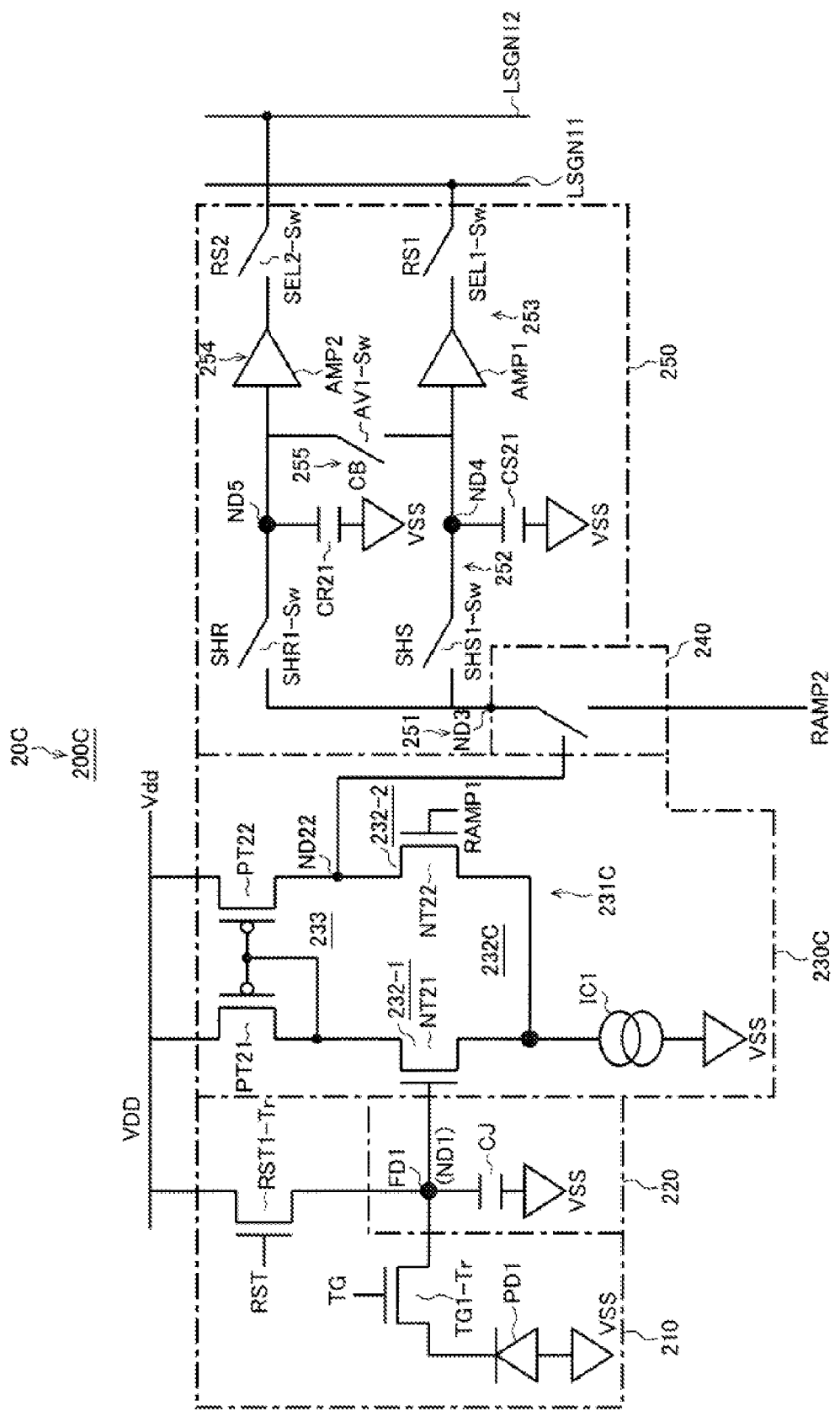
FIG. 7 shows an example configuration of a pixel according to a fourth embodiment of the present invention.

FIG. 7 shows an example configuration of a pixel relating to a fourth embodiment of the present invention.

A pixel 200C of the fourth embodiment differs from the pixel 200, 200A, 200B of the first to third embodiments in the following points. In the pixel 200C of this fourth embodiment, the source follower transistor SF1-Tr also serves as one transistor 232-1 (NT21) of the differential transistor pair 232C forming the comparator 231C in the output buffer part 230C, and the gate input of the source follower transistor SF1-Tr is used as the inverting input of the comparator 231C.

The fourth embodiment makes it possible not only to obtain the same effects as in the above-described first to third embodiments, but also to simplify the pixel circuit configuration, resulting in a reduction in the number of transistors.

Fifth Embodiment

Figure 8:
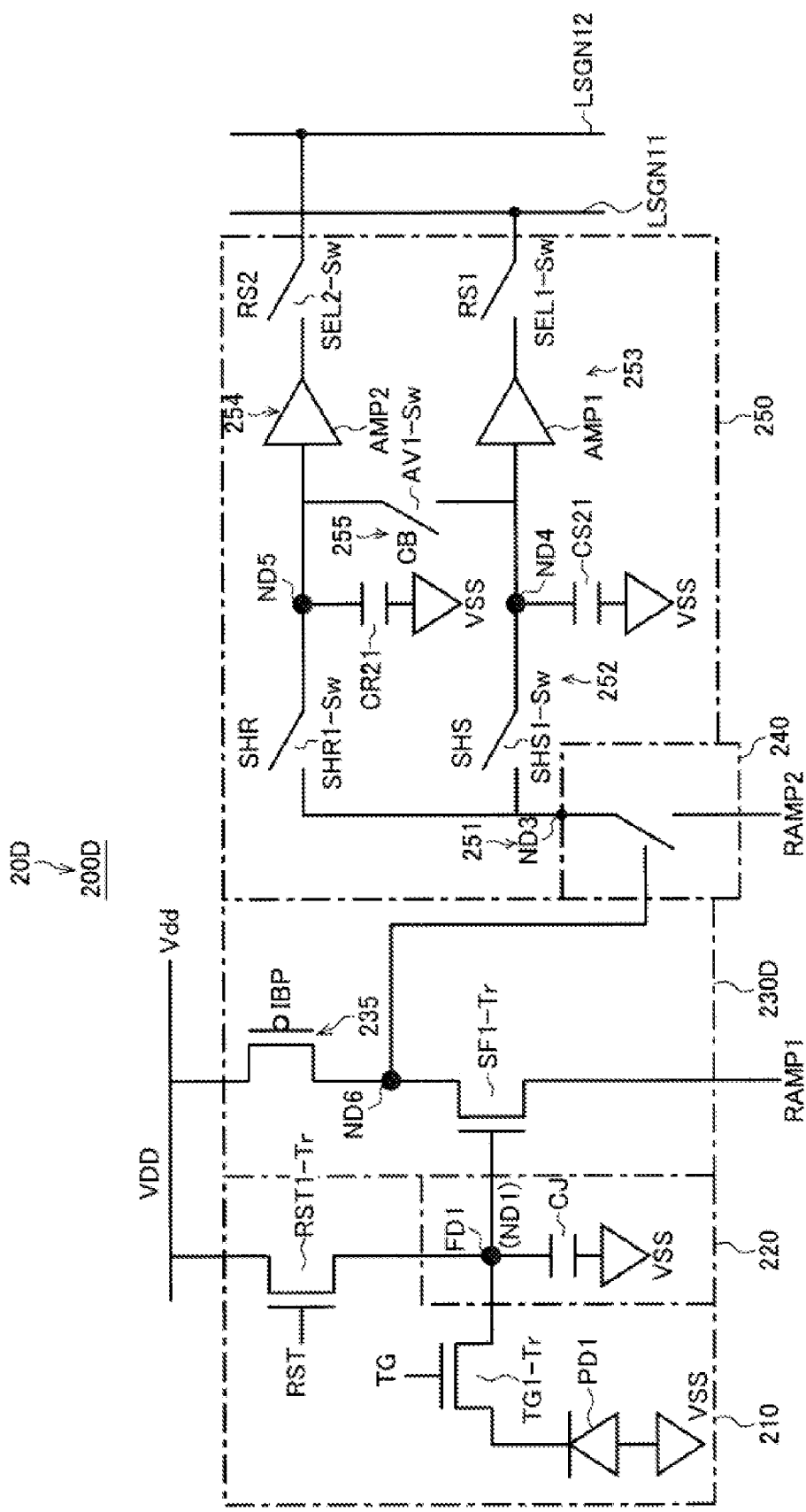
FIG. 8 shows an example configuration of a pixel according to a fifth embodiment of the present invention.

FIG. 8 shows an example configuration of a pixel relating to a fifth embodiment of the present invention.

A pixel 200D of the fifth embodiment differs from the pixel 200 to 200C of the first to fourth embodiments in the following points. In the pixel 200D of this fifth embodiment, a source input amplifier 234 is employed instead of the comparator in the output buffer part 230D. In the source input amplifier 234, the first ramp signal RAMP1 is supplied to the source of the source follower transistor SF1-Tr, and the comparison result signal SCMP is supplied to the control terminal of the holding signal readout part 240 via a connection point ND6 between the drain of the source follower transistor SF1-Tr and the load 235 formed by the PMOS transistor PT23.

The fourth embodiment makes it possible not only to obtain the same effects as in the above-described first to fourth embodiments, but also to simplify the pixel circuit configuration, resulting in a reduction in the number of transistors.

Sixth Embodiment

Figure 9:
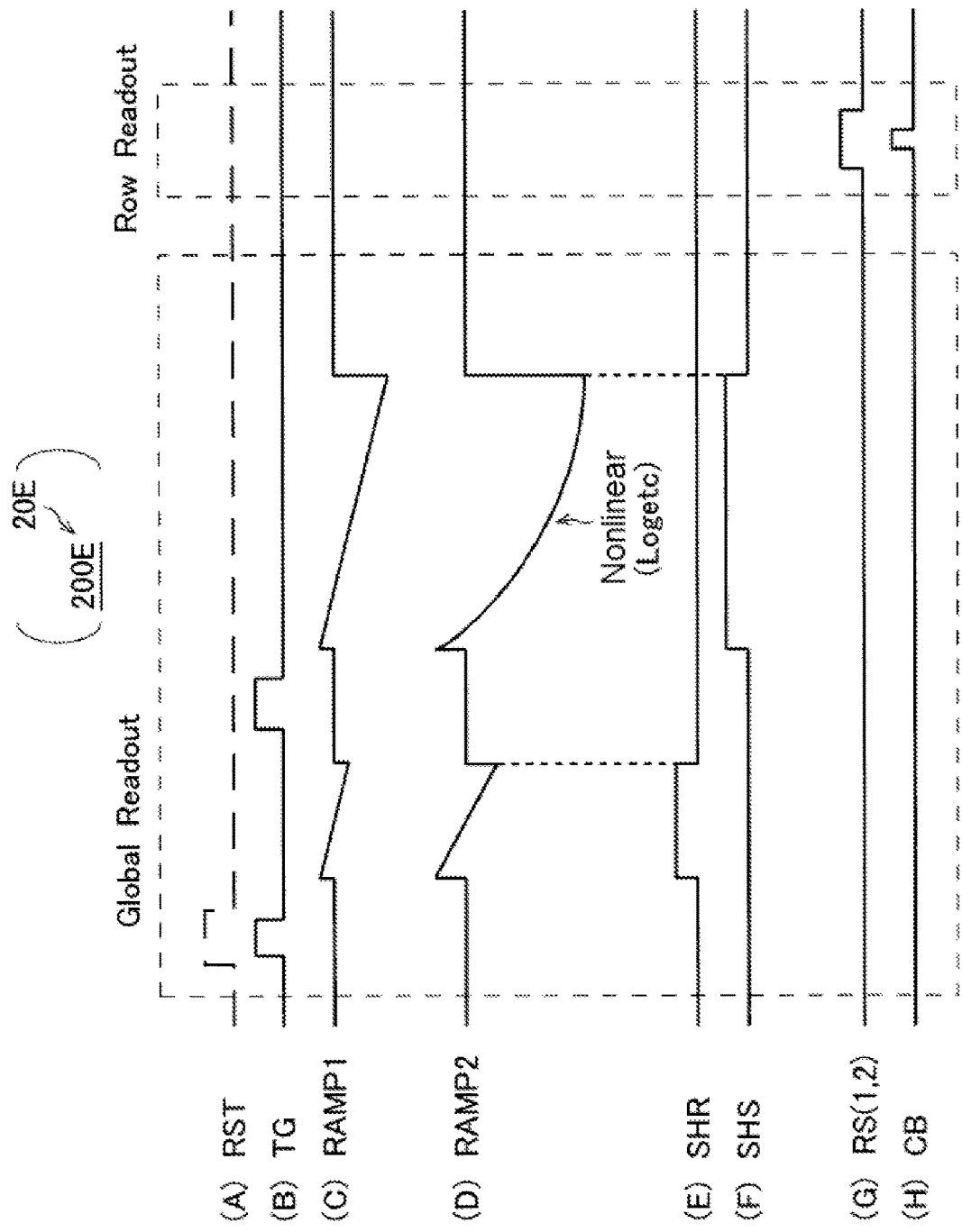
FIG. 9 illustrates a sixth embodiment of the present invention and shows another exemplary pattern of ramp signals used as reference signals.

FIG. 9 illustrates a sixth embodiment of the present invention and shows another exemplary pattern of the ramp signals used as the reference signals.

A pixel 200E of the sixth embodiment differs from the pixel 200 to 200D of the first to fifth embodiments in the following points. The pixel 200E of this sixth embodiment employs the first ramp signal RAMP1 that is a linear first reference signal and the second ramp signal RAMP2 that is a nonlinear second reference signal.

In other words, the sixth configuration employs the single slope (slope) first ramp signal RAMP1 and the linear-logarithmic (or knees) ramp pattern for the second ramp signal RAMP2. This configuration allows for data compression or flexible control of the light response curve.

According to the sixth embodiment, the low-signal region can be made linear to improve the accuracy of the CSD. It is also expected that the comparator delay is stable when compared to the first ramp signal RAMP1 having the nonlinear ramp. To use this feature, any pixel circuit of all the above mentioned embodiments can be used.

The solid-state imaging devices 10, 10A to 10E described above can be applied, as an imaging device, to electronic apparatuses such as digital cameras, video cameras, mobile terminals, surveillance cameras, and medical endoscope cameras.

Figure 10:
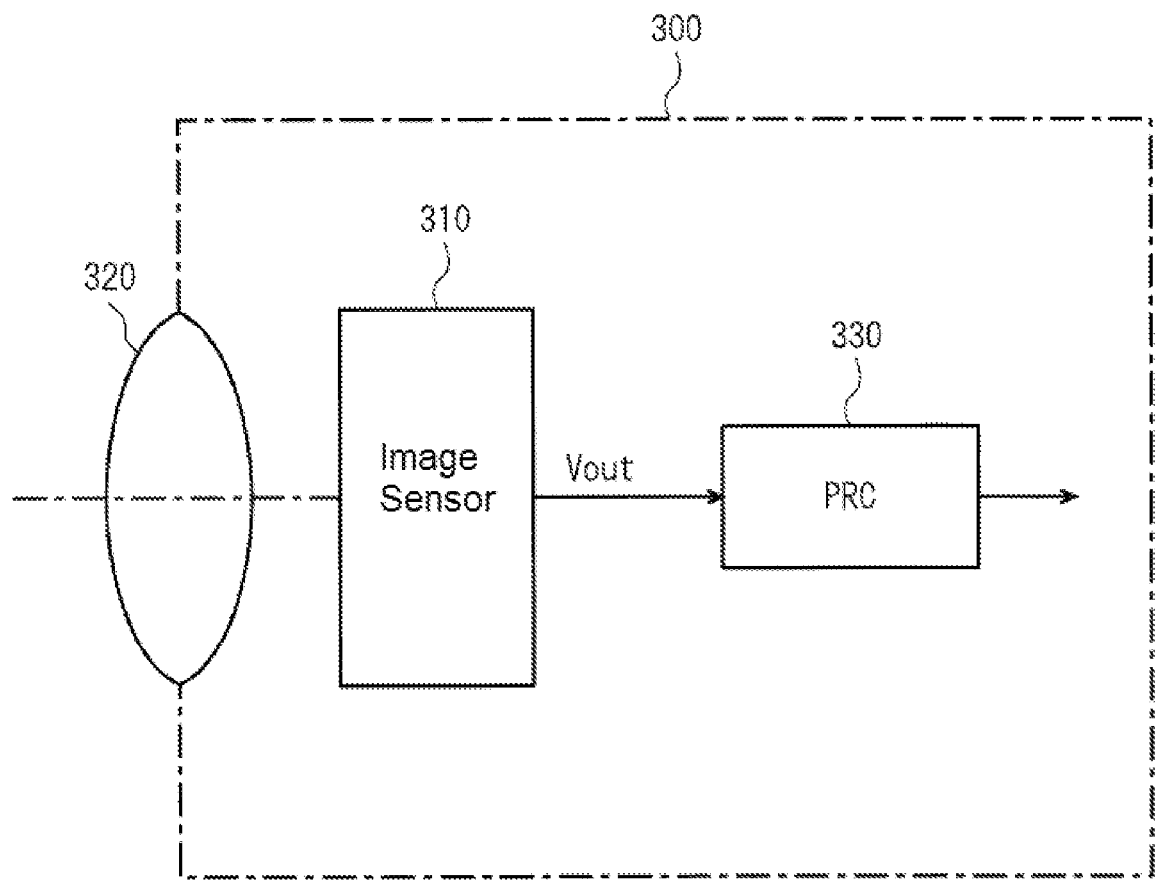
FIG. 10 shows an example configuration of an electronic apparatus to which the solid-state imaging devices relating to the embodiments of the present invention can be applied.

FIG. 10 shows an example configuration of an electronic apparatus including a camera system to which the solid-state imaging devices according to the embodiments of the present invention can be applied.

As shown in FIG. 10, the electronic apparatus 300 includes a CMOS image sensor 310 that can be constituted by any of the solid-state imaging devices 10, 10A to 10E relating to the embodiments of the present invention. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes any one of the solid-state imaging devices 10, 10A to 10E as the CMOS image sensor 310. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
   a pixel part having pixels arranged therein, each pixel being configured to perform photoelectric conversion, wherein the each pixel includes:
      a photoelectric conversion element adapted to store therein, in an integration period, charge generated by photoelectric conversion;
      a transfer element adapted to transfer, in a transfer period following the integration period, the charge stored in the photoelectric conversion element;
      an output node to which the charge stored in the photoelectric conversion element is transferred through the transfer element;
      a reset element adapted to reset, in a reset period, the output node to a predetermined voltage;
      an output buffer part adapted to convert the charge at the output node into a voltage signal corresponding to the amount of the charge, compare the voltage signal with a first reference signal, and output an active comparison result signal when the voltage signal and the first reference signal are at a same level;
      a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and
      a holding signal readout part disposed between an input node of the signal holding part and a feeding line of a second reference signal different from the first reference signal, conduction or non-conduction of the holding signal readout part being controlled depending on the comparison result signal outputted by the output buffer part.

2. The solid-state imaging device of claim 1, wherein the first reference signal is a first ramp signal having a first slope, and
   wherein the second reference signal is a second ramp signal having a second slope.

3. The solid-state imaging device of claim 2, wherein a gradient of the first slope is larger than a gradient of the second slope.

4. The solid-state imaging device of claim 1, wherein the second reference signal is nonlinear.

5. The solid-state imaging device of claim 1, wherein the signal holding part includes:
   a signal holding capacitor capable of holding the second reference signal inputted via the holding signal readout part;
   a switch element adapted to selectively connect the signal holding capacitor to the holding signal readout part; and
   an output part adapted to selectively output a signal held in the signal holding capacitor to a signal line, the signal corresponding to a voltage held in the capacitor.

6. The solid-state imaging device of claim 5, wherein the signal holding part includes:
   a first signal holding capacitor capable of holding the second reference signal inputted via the holding signal readout part, the second reference signal corresponding to the voltage signal corresponding to the charge stored in the photoelectric conversion element;
   a first switch element adapted to selectively connect the first signal holding capacitor to the holding signal readout part;
   a first output part adapted to selectively output a signal held in the first signal holding capacitor to a first signal line, the signal corresponding to a voltage held in the first signal holding capacitor;
   a second signal holding capacitor capable of holding the second reference signal inputted via the holding signal readout part, the second reference signal corresponding to the voltage signal in the reset state;
   a second switch element adapted to selectively connect the second signal holding capacitor to the holding signal readout part; and
   a second output part adapted to selectively output a signal held in the second signal holding capacitor to a second signal line, the signal corresponding to a voltage held in the second signal holding capacitor.

7. The solid-state imaging device of claim 1, further comprising:
   a storage transistor connected to the output node; and
   a storage capacitor element adapted to store therein at least the charge at the output node via the storage transistor.

8. The solid-state imaging device of claim 7, wherein the storage transistor and the storage capacitor element are connected in series between the output node and the reference voltage.

9. The solid-state imaging device of claim 7, wherein the storage transistor is connected between the output node and the reset element, and the storage capacitance element is connected between the reference voltage and the connection point of the storage transistor and the reset element.

10. The solid-state imaging device of claim 1, wherein the output buffer part includes:
    a source follower transistor adapted to convert charge in a floating diffusion into a voltage signal corresponding to the amount of the charge and output the voltage signal, a gate of the source follower transistor being connected to the floating diffusion that serves as the output node; and
    a comparator adapted to compare the voltage signal outputted by the source follower transistor with the first reference signal, the comparator outputting the digitized comparison result signal to the holding signal readout part,
    wherein the comparator compares the voltage signal with the first reference signal and inverts its output level from a non-active level to an active level when the voltage signal and the first reference signal are at the same level.

11. The solid-state imaging device of claim 10, wherein the comparator includes:
- a differential transistor pair constituted by transistors one of which receives the voltage signal fed to a gate thereof and the other of which receives the first reference signal fed to a gate thereof, the differential transistor pair comparing the voltage signal with the first reference signal; and
- an active load circuit connected to a drain side of the one transistor and a drain side of the other transistor to form a current mirror.

12. The solid-state imaging device of claim 11, wherein the one transistor of the differential transistor pair also serves as the source follower transistor.

13. The solid-state imaging device of claim 11, wherein the comparator outputs the comparison result signal from a connection point between the drain of the other transistor and the active load circuit.

14. The solid-state imaging device of one of claim 1, wherein the output buffer part includes:
- a source follower transistor adapted to convert charge in a floating diffusion into a voltage signal corresponding to the amount of the charge, a gate of the source follower transistor being connected to the floating diffusion that serves as the output node, the first reference signal being supplied to a source of the source follower transistor; and
- a load connected to a drain of the source follower transistor,
- wherein the comparison result signal is outputted from a connection point between the drain of the source follower transistor and the load.

15. A method of driving a solid-state imaging device, the solid-state imaging device including:
- a pixel part having pixels arranged therein, each pixel being configured to perform photoelectric conversion, wherein the each pixel includes:
  - a photoelectric conversion element adapted to store therein, in an integration period, charge generated by photoelectric conversion;
  - a transfer element adapted to transfer, in a transfer period following the integration period, the charge stored in the photoelectric conversion element;
  - an output node to which the charge stored in the photoelectric conversion element is transferred through the transfer element;
  - a reset element for resetting, in a reset period, the output node to a predetermined potential;
  - an output buffer part adapted to convert the charge at the output node into a voltage signal corresponding to the amount of the charge, compare the voltage signal with a first reference signal, and output an active comparison result signal when the voltage signal and the first reference signal are at a same level;
  - a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and
  - a holding signal readout part disposed between an input node of the signal holding part and a feeding line of a second reference signal different from the first reference signal, conduction or non-conduction of the holding signal readout part being controlled depending on the comparison result signal outputted by the output buffer part, the method comprising:
- applying two reference signals that have different slopes from each other to give different gradients between inputs of the two reference signals, the first reference signal that is one of the two reference signals being compared with the voltage signal, the second reference signal that is the other of the two reference signals being applied to a voltage holding signal; and
- in the output buffer part, converting the charge at the output node into the voltage signal corresponding to the amount of the charge, comparing the voltage signal with the first reference signal, outputting the active comparison result signal to make the holding signal readout part in a conduction state when the voltage signal and the first reference signal are at the same level, and holding the second reference signal in the signal holding part while obtaining an effective voltage gain.

16. An electronic apparatus comprising:
a solid-state imaging device; and
an optical system for forming a subject image on the solid-state imaging device,
wherein the solid-state imaging device includes:
- a pixel part having pixels arranged therein, each pixel being configured to perform photoelectric conversion,
- wherein the each pixel includes:
  - a photoelectric conversion element adapted to store therein, in an integration period, charge generated by photoelectric conversion;
  - a transfer element adapted to transfer, in a transfer period following the integration period, the charge stored in the photoelectric conversion element;
  - an output node to which the charge stored in the photoelectric conversion element is transferred through the transfer element;
  - a reset element adapted to reset, in a reset period, the output node to a predetermined voltage;
  - an output buffer part adapted to convert the charge at the output node into a voltage signal corresponding to the amount of the charge, compare the voltage signal with a first reference signal, and output an active comparison result signal when the voltage signal and the first reference signal are at the same level;
  - a signal holding part including at least a sample-and-hold signal holding capacitor, the sample-and-hold signal holding capacitor being capable of holding a signal corresponding to the voltage signal corresponding to the amount of the charge at the output node and capable of outputting the held signal; and
  - a holding signal readout part disposed between an input node of the signal holding part and a feeding line of a second reference signal different from the first reference signal, conduction or non-conduction of the holding signal readout part being controlled depending on the comparison result signal outputted by the output buffer part.

* * * * *